United States Patent Office 3,492,295
Patented Jan. 27, 1970

3,492,295
NEW METHINIC DYESTUFFS DERIVED FROM PYRYLIUM AND THEIR METHOD OF PREPARATION
Robert F. M. Sureau, Enghien-les-Bains, Georges R. H. Mingasson, Paris, Gilbert V. H. Kremer, Ermont, and Victor M. Dupre, Louvres, France, assignors to Ugine Kuhlmann, Paris, France
No Drawing. Filed Aug. 9, 1968, Ser. No. 751,346
Claims priority, application France, Aug. 11, 1967, 117,726
Int. Cl. C07d 7/24; C09b 23/14
U.S. Cl. 260—240                2 Claims

ABSTRACT OF THE DISCLOSURE

Dyestuffs are provided of the general formula:

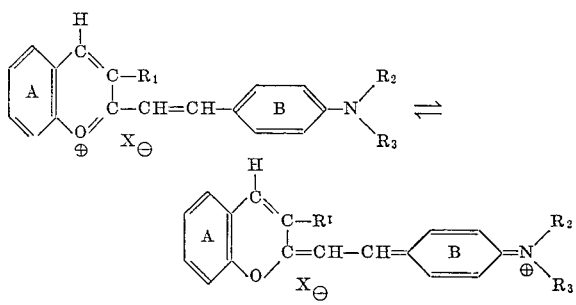

in which $R_1$ represents an alkyl group, $R_2$ and $R_3$ represent hydrogen atoms, unsubstituted alkyl groups or alkyl groups substituted by at least one halogen atom or cyano, hydroxyl or alkoxy group, and X represents a monovalent anion. These dyestuffs are particularly valuable for the colouration of fibres based on polymers or copolymers of acrylonitrile. A process for the preparation of the dyestuffs is also provided.

---

The present invention relates to new dyestuffs of the general formula:

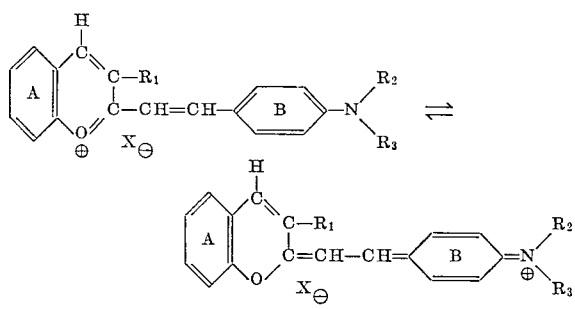

in which $R_1$ represents an alkyl group, $R_2$ and $R_3$ represent hydrogen atoms or alkyl groups possibly substituted by at least one halogen atom or cyano, hydroxyl or alkoxy group, the benzene nucleus A may be substituted by at least one halogen atom or alkyl, aryl or alkoxy group or be linked to a benzene ring, the benzene ring B may be substituted by at least one halogen atom or alkyl or alkoxy group, and X represents a monovalent anion. The alkyl groups preferably contain 1 to 4 carbon atoms.

These dyestuffs may be prepared for example by condensing pyrylium derivatives of the general formula:

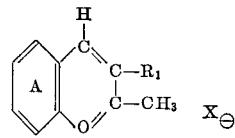   (I)

with an aldehyde of the general formula:

   (II)

wherein $R_1$, $R_2$, $R_3$, X, A and B have the meanings given above. The condensation preferably takes place in an organic alcoholic or acid solvent such as methanol, ethanol, acetic acid, or propionic acid. The reaction sometimes takes place from room temperature and generally very rapidly in the hot, the dyestuff separating from the reaction medium in crystalline form.

Among the pyrylium derivatives of Formula I, some are already known, and others are new. In a general way, they can be prepared for example by condensing an aldehyde of the formula:

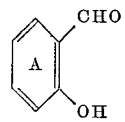

with a ketone of the formula $CH_3$—$CO$—$CH_2$—$R_1$, wherein A and $R_1$ have the meanings given above, in the presence of a strong mineral acid. In particular the starting materials for carrying out the invention may be the salts of 2,3-dimethylbenzopyrylium,
2-methyl-3-isopropyl-benzopyrylium,
2-methyl-3-butyl-benzopyrylium,
2,3-dimethyl-naphtho[β]pyrylium,
2-methyl-3-isopropyl-naphtho[β]pyrylium,
2-methyl-3-butylnaphtho[β]pyrylium and their substituted derivatives. The aldehydes of Formula II are well known as dyestuff intermediates.

The dyestuffs according to the invention are particularly valuable for the coloration of fibres based on polymers or copolymers of acrylonitrile, to which they give particularly bright and full-bodied shades ranging from blue to bluish green and endowed with very good fastness. These shades also have the advantage of being generally very stable to artificial light.

The invention is illustrated by but not limited to the following examples, in which the parts are by weight unless the contrary is indicated.

Example 1

35.7 parts of the chloroferrate of 2,3-dimethyl-benzopyrylium (prepared according to Elderfield-Heterocyclic Compounds 1951, vol. II, p. 292), and 15 parts of p-dimethylaminobenzaldehyde are heated under reflux for 15 minutes in 500 parts by volume of ethyl alcohol. The solution very quickly turns blue and the dyestuff crystallises in a solid mass in the form of fine dark blue bronzed needles. These are filtered off in the cold, washed with alcohol and dried in an oven at 65° C. Dry weight: 42.5 parts.

The dyestuff is very soluble in water and dyes acrylic fibres in a very bright and fast turquoise blue shade which keeps its brilliancy without changing colour in artificial light.

In the following table a number of other dyestuffs prepared in an analogous away from the same pyrylium salt are grouped together.

| Example | Dyestuff | Shade on acrylic fibres |
|---|---|---|
| 2 | 4'-methylamino-2-phenylvinylene-3-methyl-benzopyrylium chloroferrate. | Royal blue. |
| 3 | 4'-dimethylamino-2'-methyl-2-phenylvinylene-3-methyl-benzopyrylium chloroferrate. | Turquoise blue. |
| 4 | N'-methyl-N'-hydroxyethyl-4'-amino-2-phenylvinylene-3-methyl-benzopyrylium chloroferrate. | Do. |
| 5 | N'-methyl-N'-chloroethyl-4'-amino-2-phenylvinylene-3-methyl-benzopyrylium chloroferrate. | Do. |

Example 6

The benzopyrylium salt used in Example 1 is replaced by 38.5 parts of 2,3,6,8-tetramethyl-benzopyrylium choloroferrate and the operation is finished under the same conditions. 42.5 parts of a dyestuff of very similar shade and tinctorial qualities are thus obtained.

In order to prepare the 2,3,6,8-tetramethyl-benzopyrylium salt the procedure is as fololws: a stream of gaseous hydrochloric acid is passed for 4 hours at 20° C. into a solution of 18 parts of anhydrous ferric chloride, 15 parts of 2-hydroxy-3,5-dimethyl-benzaldehyde and 24 parts of methylethyl-ketone in 100 parts of glacial acetic acid. A precipitate of 2,3,6,8-tetramethyl-benzopyrylium chloroferrate is formed, which is drained and recrystallised from 50 parts by volume of acetic acid. After filtering off, draining and drying under vacuum, 12.7 parts of this salt are thus obtained as a light yellow crystalline powder.

Examples 7 and 8

On replacing the pyrylium salt used in Example 1 by equivalent proportions of 2-methyl-3-isopropyl-benzopyrylium chloroferrate or 2-methyl-3-n-butyl-benzopyrylium chloroferrate, under similar conditions dyestuffs of which the tinctorial properties are very similar are obtained.

The preparation of these new salts is analogous to that described in Example 6, using methylisobutylketone or methylamylketone instead of methylethylketone.

Example 9

On replacing the benzopyrylium salt used in Example 1 by 40.6 parts of 2,3-dimethyl-naptho [β]pyrylium chloroferrate, under identical conditions 43 parts of a dyestuff are obtained which dyes acrylic fibres in a bright bluish green shade which is stable to artificial light.

The naphthopyrylium salt used in this Example is a new product. It was prepared as follows: 34 parts of 2-hydroxy-1-napthaldehyde and 36 parts methylethylketone are introduced into a solution at room temperature of 36 parts of anhydrous ferric chloride in 200 parts of glacial acetic acid. This mixture is saturated by agitation with a stream of dry hydrogen chloride and this gas is bubbled through for 4 hours. The salt gradually precipitates from the deep red mass. It is cooled externally, and the salt filtered off, washed with acetic acid and dried under vacuum. 34 parts of 2,3-dimethyl-naphtho[β]pyrylium chloroferrate are obtained in the form of a beige crystalline powder fairly soluble in hot alcohol and sparingly soluble in water.

We claim:
1. A dyestuff of the formula:

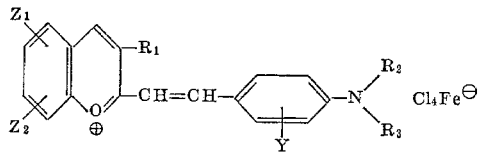

in which $R_1$ represents an alkyl group having up to four carbon atoms, $R_2$ and $R_3$ each represents a hydrogen atom or a methyl, hydroxyethyl or chloroethyl group, Y represents a hydrogen atom or a methyl group and $Z_1$ and $Z_2$ each represent a hydrogen atom or a methyl group.

2. 4'-dimethylamino-2-phenylvinylene-3-methyl-benzopyrylium chloroferrate.

References Cited

UNITED STATES PATENTS 2,461,484   2/1949   Thompson.
3,301,683   1/1967   Jurd.

JOHN D. RANDOLPH, Primary Examiner

U.S. Cl. X.R.

8—55; 260—345.2